US008510779B2

(12) United States Patent
Slothouber et al.

(10) Patent No.: US 8,510,779 B2
(45) Date of Patent: Aug. 13, 2013

(54) SELF-CONTAINED MINI-APPLICATIONS SYSTEM AND METHOD FOR DIGITAL TELEVISION

(75) Inventors: Louis P. Slothouber, Leesburg, VA (US); Aaron Yong Ye, Ashburn, VA (US)

(73) Assignee: Fourthwall Media, Inc., Sterling, VA (US)

( * ) Notice: Subject to any disclaimer, the term of this patent is extended or adjusted under 35 U.S.C. 154(b) by 1288 days.

(21) Appl. No.: 11/532,286

(22) Filed: Sep. 15, 2006

(65) Prior Publication Data

US 2007/0061724 A1     Mar. 15, 2007

Related U.S. Application Data

(60) Provisional application No. 60/716,928, filed on Sep. 15, 2005.

(51) Int. Cl.
*H04N 5/445* (2011.01)
(52) U.S. Cl.
USPC ............... 725/51; 725/43; 725/44; 725/47
(58) Field of Classification Search
USPC .......................... 725/43, 44, 47, 51
See application file for complete search history.

(56) References Cited

U.S. PATENT DOCUMENTS

| | | | |
|---|---|---|---|
| 6,360,195 B1 * | 3/2002 | Liao et al. | 703/28 |
| 7,030,890 B1 * | 4/2006 | Jouet et al. | 345/619 |
| 7,490,295 B2 * | 2/2009 | Chaudhri et al. | 715/764 |

(Continued)

FOREIGN PATENT DOCUMENTS

| | | |
|---|---|---|
| JP | 2001-1502096 | 2/2001 |
| JP | 2002-528971 | 2/2001 |

(Continued)

OTHER PUBLICATIONS

Sun Microsystems, Inc. Java TV API Specification, Retrieved from the Internet on Jun. 6, 2011 at: http://java.sun.com/products/javatv/javatvspec0_9_0.html.

(Continued)

*Primary Examiner* — Pankaj Kumar
*Assistant Examiner* — Sahar Baig
(74) *Attorney, Agent, or Firm* — Hunton & Williams LLP

(57) ABSTRACT

A system, method and software program is provided for creating and implementing self-contained mini-applications that store, retrieve and display data and allow user interaction in a constrained computing environment such as a set-top box used in the delivery of digital television. The system, method and software program of the present invention, also known as "TV widgets" allows users to personalize data and facilitate the access of such data with a click of a button from a remote control unit. The TV widgets include a myriad of widgets of which some are, "My 8 ball", a widget that recommends television programming to a viewer, "My TV search" for searching specific television programs, "My Weather", "My Yellow Pages", "Smart Navigation", "Instant Messaging with Smart User Interface", as well as others. A TV widget framework provides user interface context for launching and managing the widgets, in addition, it maintains a library code that implements the TV widget components. Among the implementations of the TV widgets is a widget based TV navigator created as a collection of widgets from conventional grid guides and navigators that include a grid guide widget, a "what's on now" widget (sorted by channel), a movie recommendation widget among others.

36 Claims, 14 Drawing Sheets

(56) References Cited

U.S. PATENT DOCUMENTS

| | | |
|---|---|---|
| 7,546,543 B2 * | 6/2009 | Louch et al. .................. 715/762 |
| 2002/0015093 A1 | 2/2002 | Dureau et al. |
| 2002/0026462 A1 | 2/2002 | Shotten et al. |
| 2002/0156938 A1 * | 10/2002 | Wong et al. ................... 709/328 |
| 2003/0004961 A1 | 1/2003 | Slothouber et al. |
| 2003/0058277 A1 | 3/2003 | Bowman-Amuah |
| 2003/0112467 A1 * | 6/2003 | McCollum et al. .......... 358/1.18 |
| 2004/0136698 A1 * | 7/2004 | Mock ............................ 386/123 |
| 2005/0028206 A1 * | 2/2005 | Cameron et al. ............... 725/46 |
| 2006/0242584 A1 * | 10/2006 | Johanson et al. ............. 715/738 |

FOREIGN PATENT DOCUMENTS

| | | |
|---|---|---|
| JP | 2002-522844 | 7/2002 |
| JP | 2004-536398 | 9/2002 |
| WO | WO 99/04349 | 1/1999 |
| WO | WO 00/10081 | 2/2000 |
| WO | WO 2005/074252 | 8/2005 |
| WO | WO 2005/081895 | 9/2005 |

OTHER PUBLICATIONS

Schwalb, iTV Handbook: Technologies and Standards, iTV Scenarios, pp. 25-159, Jan. 1, 2004.
Extended European Search Report for European Application No. 06814770.1, dated Mar. 4, 2011.
Japanese Reasons for Rejection for Japanese Application No. 2008-531371, dated Sep. 26, 2012.
Unknown; "Brand New Tiger"; Mac Fan, No. 266, pp. 48-49; Jun. 1, 2005.
Nakamoto, Koichi; "The 14$^{th}$ TRON Project International Symposium"; TRONWARE, vol. 51, pp. 40; Jun. 10, 1998.
Japanese Reasons for Rejection for Japanese Application No. 2008-531371, dated Mar. 29, 2012.

* cited by examiner

```
SPLAT thread = 'SAMP' {
    import "WidgetLib.splat";    --Load in library definitions
    array byte background_image[] = binary "background.jpg";
    class myWidget(Widget) {
        int onFocus() {
            DrawImage(0,0, background_image);
            DrawText(10,10, "This is a test widget");
        }
    }
    int main () {
        myWidget.init(100, 100);
        myWidget.eventloop();
    }
}
```

SELF-CONTAINED MINI-APPLICATIONS SYSTEM AND METHOD FOR DIGITAL TELEVISION

The present application claims priority to and incorporates by reference in its entirety U.S. Provisional Patent Application No. 60/716,928, entitled "Self-contained Mini-applications Apparatus and Method for Digital Television".

FIELD OF THE INVENTION

The invention relates generally to the field of interactive television systems. Embodiments may include a method and a software program execution apparatus for providing a new application model and graphical user interface in an interactive television system. Embodiments may also include a collection of small, independent mini-applications or widgets in place of the traditional monolithic software application model currently used in the interactive television space.

BACKGROUND OF THE INVENTION

While user interfaces are vastly more user-friendly now than in recent years, the current television navigation systems are still too cumbersome, poorly organized, and tend to overwhelm a viewer with too much irrelevant information and not enough useful information. Current systems often require too many manipulations of remote control buttons to accomplish simple tasks. Because of this unnecessary complexity many people will not be able to gain access to the vast array of interactive television available now and in the future.

Cable and satellite television providers and the telecommunication industry have taken advantage of computer and communication advancements by providing an ever-increasing array of services to their customers. Primarily, recent advancements in fiber optic and digital transmission technology have enabled the television provider industry to increase channel capacity and provide some degree of interactive television service. This advancement is due in large part to the industry combining the processing power of a computer in the form of a cable set-top-box and cable's large capacity to carry information. Such cable boxes have successfully been used by the industry to provide both a greater selection of channels and some degree of interactivity. However, today's on-screen applications are often non-intuitive, clumsy or difficulty to operate.

SUMMARY OF THE INVENTION

A widget is a generic term with a variety of meanings assigned to it over the years. Herein, however, the term widget (self-contained mini-application is interchangeably used in this application) denotes a tightly integrated collection of procedures, data, and a graphical user interface (GUI) dedicated to a single, well-defined task. And a TV widget is a widget designed to run in an interactive television environment. In other words, a TV widget is a mini-application that provides a single service. For example, a small window that displays the current weather over top of the video on TV is a TV widget. TV widgets differ from traditional interactive television applications that traditionally bundle many services into a single "application", in that each widget implements a single feature or service of a traditional application as a separate, independent, mini-application. Examples of applications that are not widgets include (1) the traditional TV navigator, including in one application: (a) an interactive guide for finding TV programs in a two dimensional time vs. channel grid, (b) video on demand program access, (c) channel banners, (d) parental controls, (e) and other services; and (2) news and information applications that aggregate on one screen information about news headlines, stock quotes, weather, traffic, sports scores, etc.

While TV widgets that form part of certain embodiments of the present invention are not prior art, prior art related to widgets includes:

Konfabulator is a tool for running desktop widgets on Macintosh and Windows computers. A Konfabulator widget is a collection of files (XML, JAVA Script, Graphics, etc.) that collectively define a small, single-purpose software application (e.g., display today's weather, display stock quotes, a calculator, etc.).

Interactive TV to date (e.g., as developed by BIAP, Navic, BlueStreak, GoldPocket, Buzztime, and the cable companies) has been implemented via the PC model, where each application is a unique context providing all functions applicable to that context. While some applications may allow you to continue watching TV (usually in a reduced or overlaid screen) the concept of creating a custom mini-application for small self-contained tasks overlaid on top of TV has not been demonstrated previously.

ETV (by CableLabs) OpenCable specification for enhanced TV applications can be embedded within the broadcast video (MPEG) stream and are beamed out from the broadcaster. The EBIF (ETV Binary Interchange Format) applications are much more simplistic than BIAP's TV Widgets, and can only perform rudimentary drawing and user interaction. Higher level functionality (e.g., program recommendations, interaction with eBay via the internet, etc.) are beyond standard EBIF applications.

OCAP (by CableLabs) Open Cable Applications Platform is an effort to provide a JAVA environment on consumer electronics equipment, like the set-top-boxes, TVs. While one use of Sun's JAVA environment was originally to execute small applications in the context of an Internet browser, recent trends (including OCAP) apply JAVA to conventional, PC-like application development and execution. OCAP applications to date (including BIAP's own legacy applications) are all still built on the big application model, and not on the widget model.

Some of the drawbacks of widgets as they relate to television lie in the PC-style application model that is not well suited to the TV viewing context. As such, a less intrusive, easier to understand model is needed. Another problem is that there are insufficient computing resources (memory and CPU) in existing TV set-top-boxes to run either large applications or Konfabulator-style widgets, as seen on the desktop. In addition, desktop computer mechanisms for downloading, integrating, and executing widgets generally do not work on the TV environment. Even if sufficient computing resources were available, there is no mechanism to download and invoke a Konfabulator widget in today's interactive TV environment.

Accordingly, a need exists for a method to facilitate a variety of application features and services on television, including recommendation of programming, personalized multi-media content, and navigational aids via a multitude of widgets to effect a visually appealing interaction with the GUI, and more effectively access all the available viewer desired information.

The method and system of the present invention provides to users, self-contained mini-applications (known as TV Widgets) that hold data and allow user interaction for use in constrained computing environments, such as a set-top box, for use in a television medium to be displayed on user's TV screen as needed. TV widgets allow viewers to personalize data and allow the access of the data with a click of a button from a remote control unit. The TV widgets include a myriad of widgets, which include, but not limited to widgets such as, "My 8 ball", a widget that recommends television programming to a viewer, "My TV search", another widget for searching specific television programs, "My Weather" a widget that displays weather conditions of localities, "My Yellow Pages" a widget that retrieves and displays information about businesses, "Smart Navigation", and "Instant Messaging with Smart Text Input."

In an exemplary embodiment of the present invention, a system and method creates and implements self-contained mini-applications for digital television, where the self-contained mini-applications are defined as a source code program written in a computer language (e.g., C, SPLAT) that may import graphics files and other required data and stored in a library source code. The source code program is transferred to a compiler to be translated into a bytecode format suitable for execution on target virtual machine (VM) that implements a bytecode interpreter which is comprehensible for interactive television applications. The system and method of the present invention further transforms the byte code into a JAVA byte code suitable for a JAVA virtual machine when a middleware is employed, otherwise, the bytecode is transformed into a JAVA sub-set byte code suitable for a target virtual machine when other applications are to be presented. The system and method then maps a canonical set of internal application programming interfaces (APIs) used by individual applications such as PiTV, eBay on TV, Fantasy sports, as well as other interactive applications into the APIs of the operating system, resident application, or middleware to create self-contained mini-applications (i.e. TV widgets) that are displayed on a television allowing users to interact with those applications.

In another embodiment, a TV widget framework is disclosed that provides the computing support and common library procedures for many of the user interface components (e.g., smart text entry) and computing functions (e.g., HTTP networking) used by widgets. The TV widget framework also provides a graphical user interface context (e.g., a "dashboard", "dock", or "launch bar") from which widgets may be selected and executed. The TV widgets and the TV Widget framework of the present invention may be integrated into a specific architecture of an MSO, or may be implemented as a stand-alone framework. TV Widgets and the TV Widgets framework allow traditional applications to be represented by a collection of independent TV widgets, each performing a specific function. Such a partitioning of application functionality into smaller chunks, uses scarce computing resources (DRAM memory, Flash memory, CPU cycles, and bandwidth) more frugally, obviates the need for navigation via remote control through the multitude of features in a complex application, and presents a simpler and more direct user interface with direct and obvious actions associated with the selection (i.e., execution) of a widget.

In an alternative embodiment of the present invention, the system and method for creating and displaying television widgets includes downloading Television widgets onto a set-top box, or any other consumer electronics device capable of displaying the TV widgets either via a high-speed in-band data carousel or by embedding the widgets within the broadcast video stream (MPEG). The advantage of downloading the TV widgets lies in the power of the TV widgets' ability to perform high-level computation and leverage the facilities in the TV Widget Framework (e.g., recommendation engine, smart interface components, etc.). In addition, the TV widgets of the present invention consist of bytecode, and are much more compact than corresponding XML content in other embodiments, and are invoked via the selection of a corresponding icon from a "task bar". The television widgets of the present invention are executed on a TV widget virtual machine which is contained within the TV widget framework. In addition, the TV widget framework provide a number of built-in components such as dynamic libraries, and data modules for all widgets to use, so that widgets may be executed without the need to include code to implement such components as buttons, list boxes, Smart Entry Fields, Virtual Keyboards, Menus, Images, Static Text, Tickers, and others.

DETAILED DESCRIPTION

The following description is intended to convey a thorough understanding of the invention by providing a number of specific embodiments and details involving various applications of the invention. It is understood, however, that the invention is not limited to these embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs. In particular, though the present embodiment describes an application primarily in the digital cable television environment, the concepts apply equally well to digital satellite television, Internet Protocol-based Television (IPTV), video over wireless, cell-phone video, and others The present invention relates to a software program and method which is implemented as a small, self-contained mini-application designed for execution in a constrained computing environment such as, a set-top-box or other consumer electronics equipment that performs a single task. Multiple TV Widgets may collectively represent a conventional application. For example, BIAP's eBay auction application may be represented by a collection of the following widgets: eBay auction bid widget, eBay auction alert widget, eBay auction tracking widget, eBay auction search widget. These self-contained mini applications are stored in a widget library as a bytecode, and are retrieved as needed by different applications such as PiTV, EBay, Fantasy Football etc., and displayed on a user's television screen. The software program and method of the present invention allows the user to implement each atomic task in a large application, or individual mini applications as an independent TV widget, where each individual TV widget may be used independently without switching the viewer's context from watching a television program to entering an application.

Figure 2:
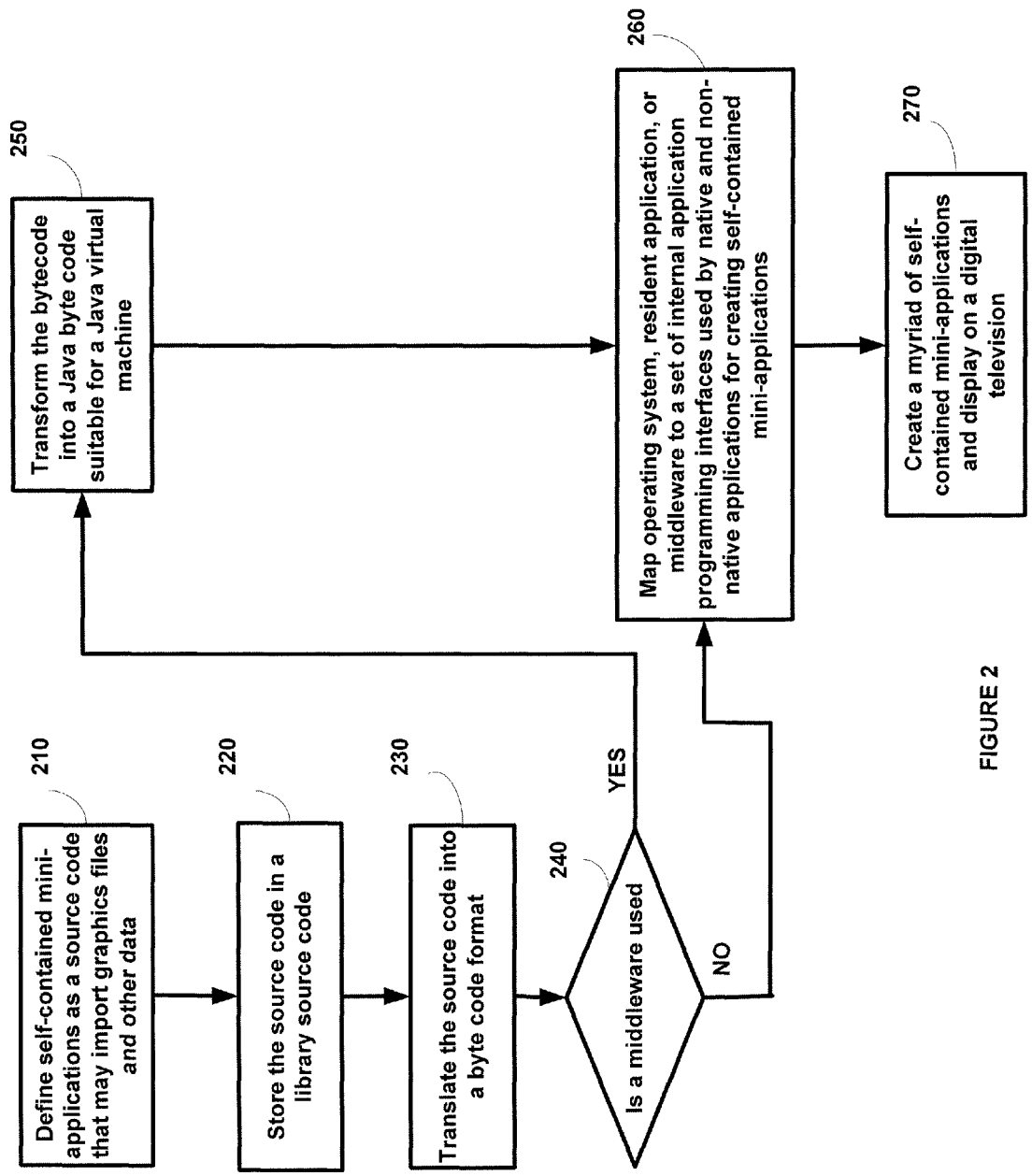
FIG. 2 is a flowchart indicating steps for creating and implementing television widgets according to an embodiment of the present invention.

In an exemplary embodiment of the present invention, and in reference to FIG. 2, the system and method creates and implements self-contained mini-applications for digital television. Initially, the self-contained mini-applications are defined as a source code program written in a computer language (e.g., C, SPLAT) that may import graphics files and other required data in step 210, the source code is then stored in a library source code in step 220. The source code program that may be written or generated by a more automated tool is transferred to compiler, and translated into a bytecode format suitable for execution on target virtual machine (VM) that implements a bytecode interpreter which is comprehensible for interactive television applications in step 230. In step 240 the system and method determines whether any other middleware such as OpenCable Applications Platform (OCAP™) specification is employed. If the answer is "Yes", the bytecode is further transformed into a JAVA byte code suitable for a JAVA virtual machine in step 250. If the answer is "No", in step 260, the system and method maps a canonical set of internal application programming interfaces (APIs) used by individual applications, such as PiTV, eBay on TV, Fantasy sports, as well as other interactive applications to create self-contained mini-applications (i.e. TV widgets) into the APIs of the operating system (e.g. PowerTV, GIOS, and miscellaneous operating systems), resident application (e.g. SARA, Atlas, TV Guide, Passport) or middleware (e.g. OCAP) to create self-contained mini-applications (i.e. TV widgets) that are displayed on a television allowing users to interact with those applications.

Figure 1:
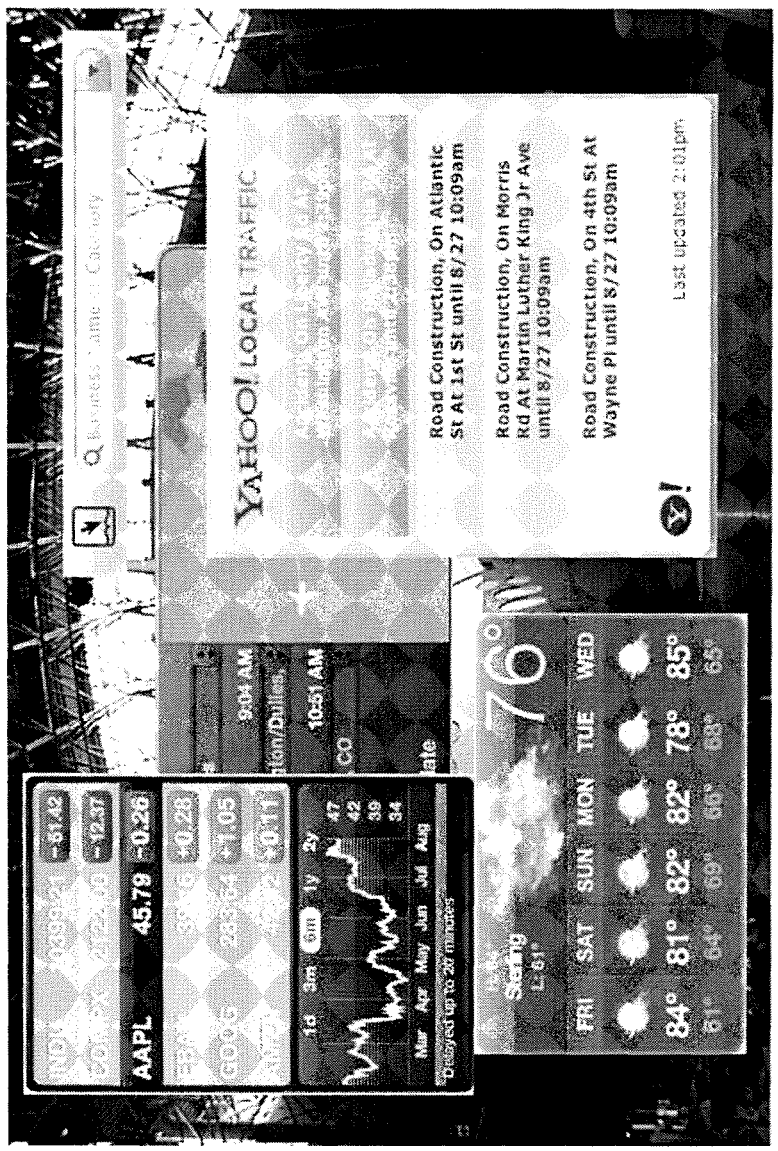
FIG. 1 is a prior art diagram illustrating a number of Apple Mac OSX widgets.

FIG. 1 is a prior art diagram illustrating the execution of an Apple Mac OSX system. In comparison, TV Widgets as described earlier are small, self-contained, executable chunks of code and data that may be executed to perform a single, well defined task. The TV Widgets are implemented as programs, written in an appropriate programming language (in one embodiment, it's SPLAT) and compiled into executable code (in our embodiment, it is SPLAT bytecode).

Figure 3:
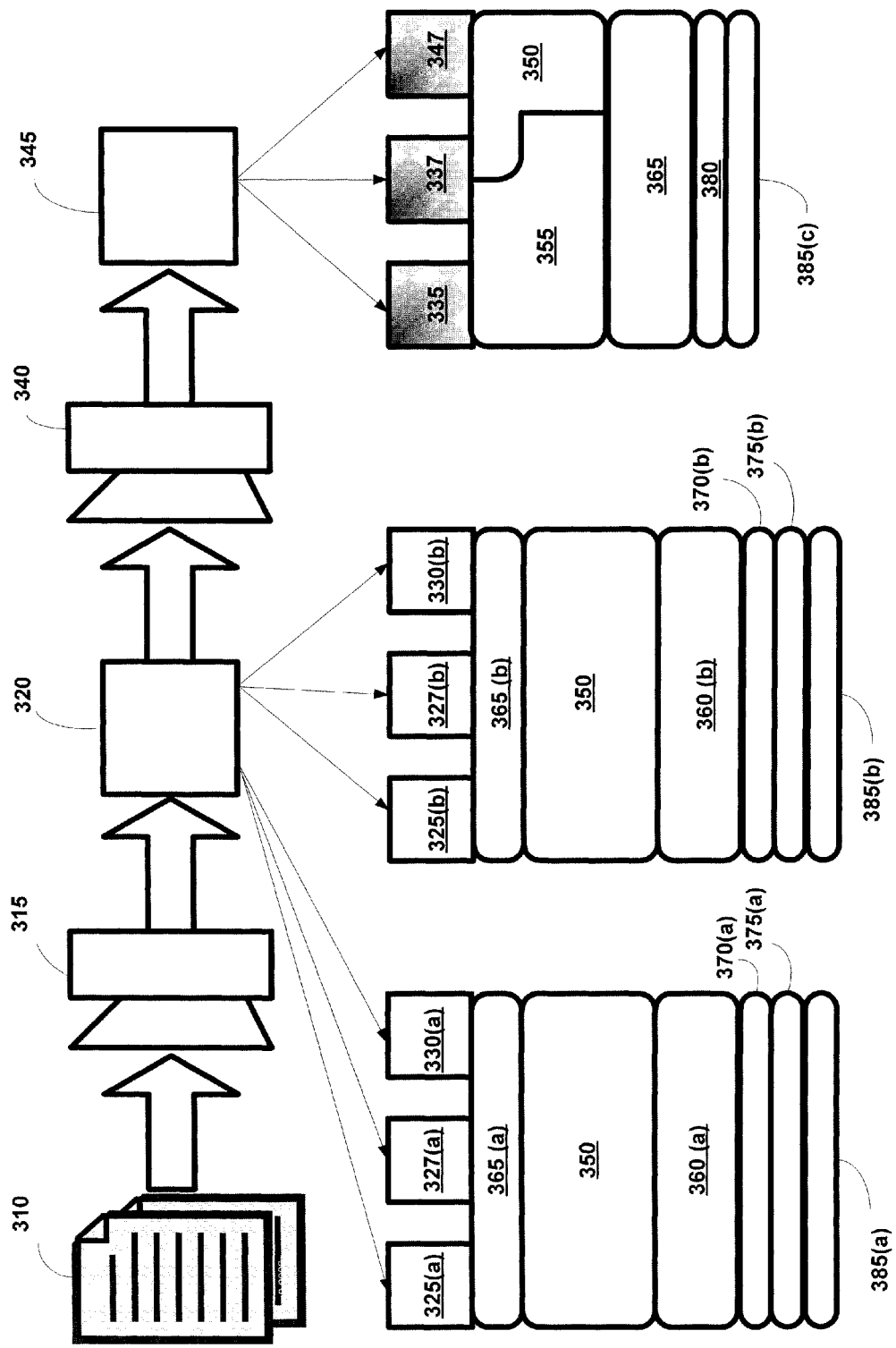
FIG. 3 is a software/hardware architecture illustration including, among other items, a widget library and a widget framework according an embodiment of the present invention.

In an exemplary embodiment of the present invention, and in reference to FIG. 3, the system and method demonstrates a widget path from widget development to execution. Initially, the widget is defined and stored in a library source code 310, the widgets are defined as a source code program written in a computer language (e.g., SPLAT). The source code program that may be written or generated by a more automated tool is transferred to compiler 315. The source code program may also import graphics files and other data that will be incorporated into the final widget output by the source code (e.g., SPLAT) compiler. Compiler 315 translates the source code program into bytecode format 320 suitable for execution on target virtual machine (VM) 365(a) and (b) that implements a bytecode interpreter which is comprehensible for interactive television applications. In a preferred embodiment, SPLAT source code is compiled into SPLAT bytecode for execution on a SPLAT virtual machine, such as 365 (a), a virtual machine for creating widgets related to applications such as PiTV (personalized interactive television) 325(a) and (b), eBay on TV 327 (a) and (b) and fantasy sports 330 (a) and (b). Application shell 360(a) and (b) provide an API (Application Programming Interface) for widget framework 350 (a) and (b) that wraps an application environment and several low-level services that are provided by set-top box 385(a), such as Scientific Atlanta's Explorer, and 385(b), such as Motorola's Digital Cable Terminal operating system (e.g., PowerTV, GIOS) 375 (a) and (b), resident application (e.g., SARA, Atlas, TV-Guide, Passport) 370 (a) and (b) and middleware that include graphics, video, sound, and other display services, along with an application event management. The resulting bytecode form of the widget may contain data imported from other files (e.g., graphics), and may reference external library routines provided by the widget framework. The actual source code languages, compilers, and virtual machines employed are not relevant to the invention, and anyone normally skilled in the art could replicate the functionality of widgets and the widget framework using other source code languages, compilers, and virtual machines.

Additionally, in situations where a middleware such as OpenCable Applications Platform (OCAP™) specification is employed, a translation step may be utilized to generate bytecode for JAVA systems. The translated source code program into a bytecode format is done by compiler 315 and further translated at bytecode translator 340 that transforms it into JAVA bytecode 345 suitable for execution on JAVA virtual machine (JVM) 365(c) that interprets JAVA bytecode for creating JAVA applets related to applications such as PiTV (personalized interactive television) 335, eBay on TV 337 and fantasy sports 347. OCAP libraries 355 provide an API (Application Programming Interface) for widget framework 350 that wraps an application environment and several low-level services that are provided by related customer premise equipment 385(c), running on any one of a myriad of operating systems 380.

Tools may be provided to automatically generate parts of widgets (e.g., graphical UI components) without programming. For example, many widgets merely retrieve information from web sites or RSS feeds and display it in a small window. Defining such a widget could be merely a process of selecting from among a pre-defined series of choices (e.g., widget window size, solid or image background, text font, and URL of source RSS data) and one of ordinary skill in the art in possession of the present specification could implement both a tool to allow a developer to select from these options and a widget template that could be modified by the tool to accommodate the developer's choices.

Figure 4:
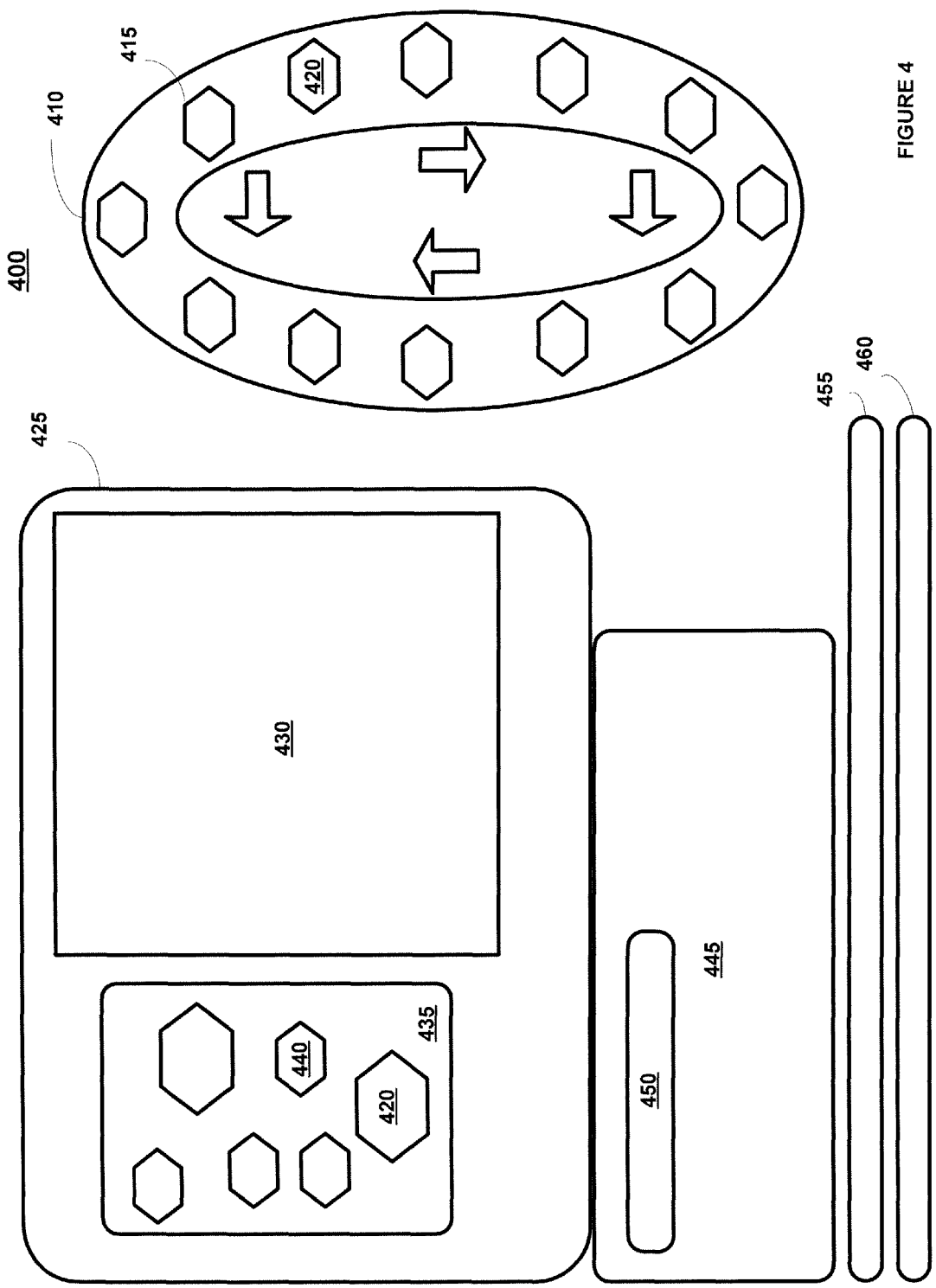
FIG. 4 is a block diagram of television widget framework (TVWF) implementation according to an embodiment of the present invention.
Figure 8:
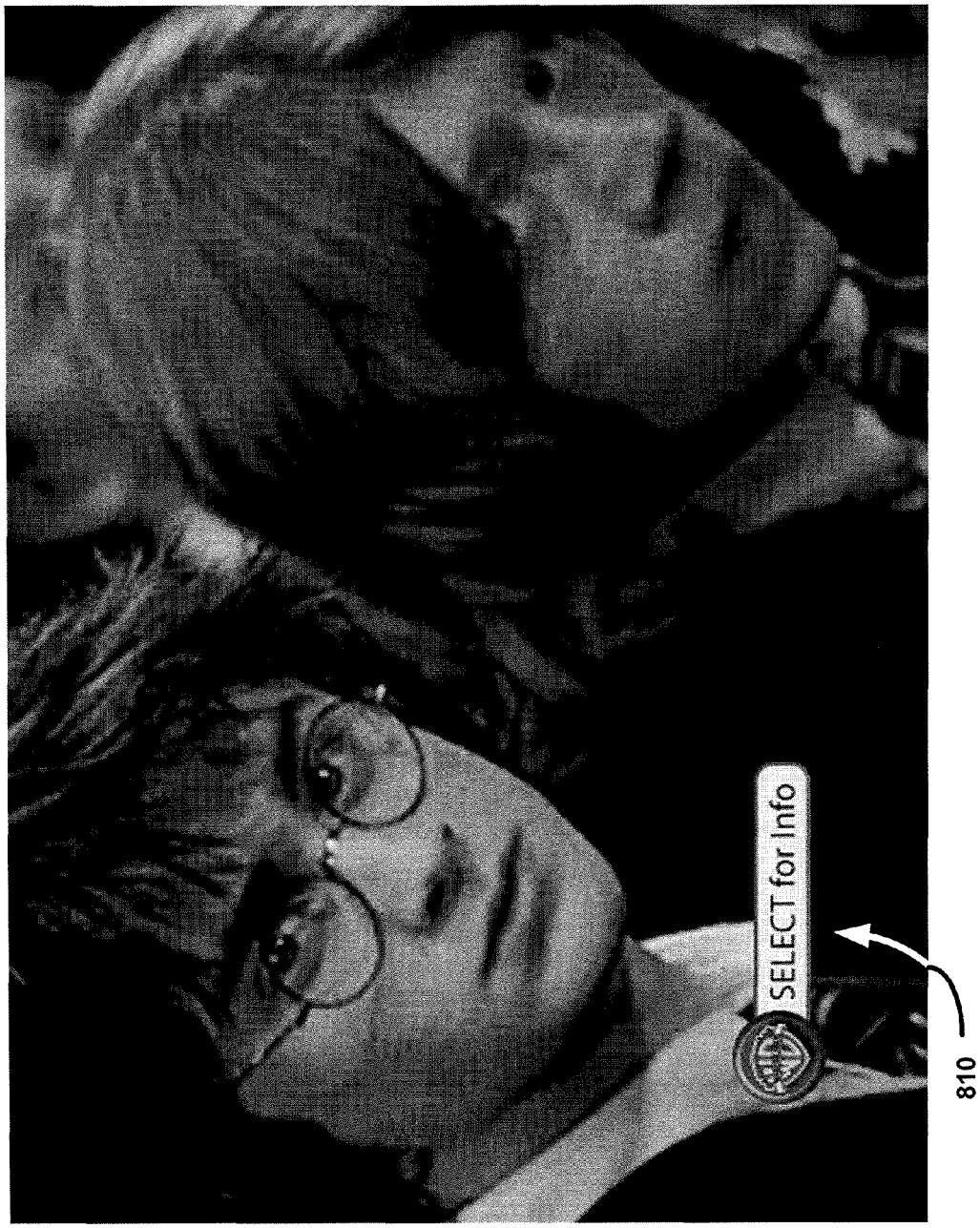
FIGS. 8(a)-(h) are illustrations of different types of widgets according to various embodiments of the present invention.
Figure 8:
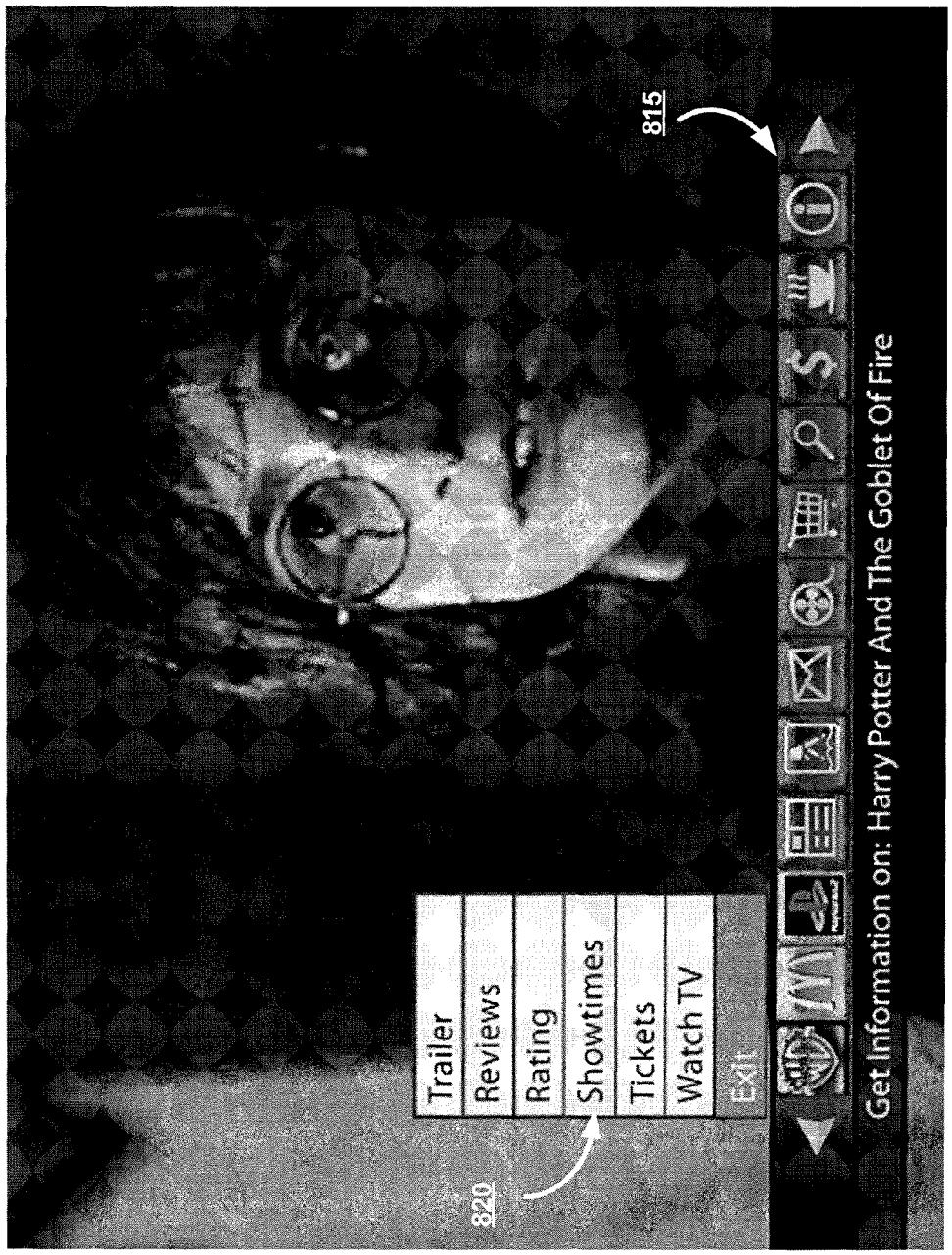
Figure 8:
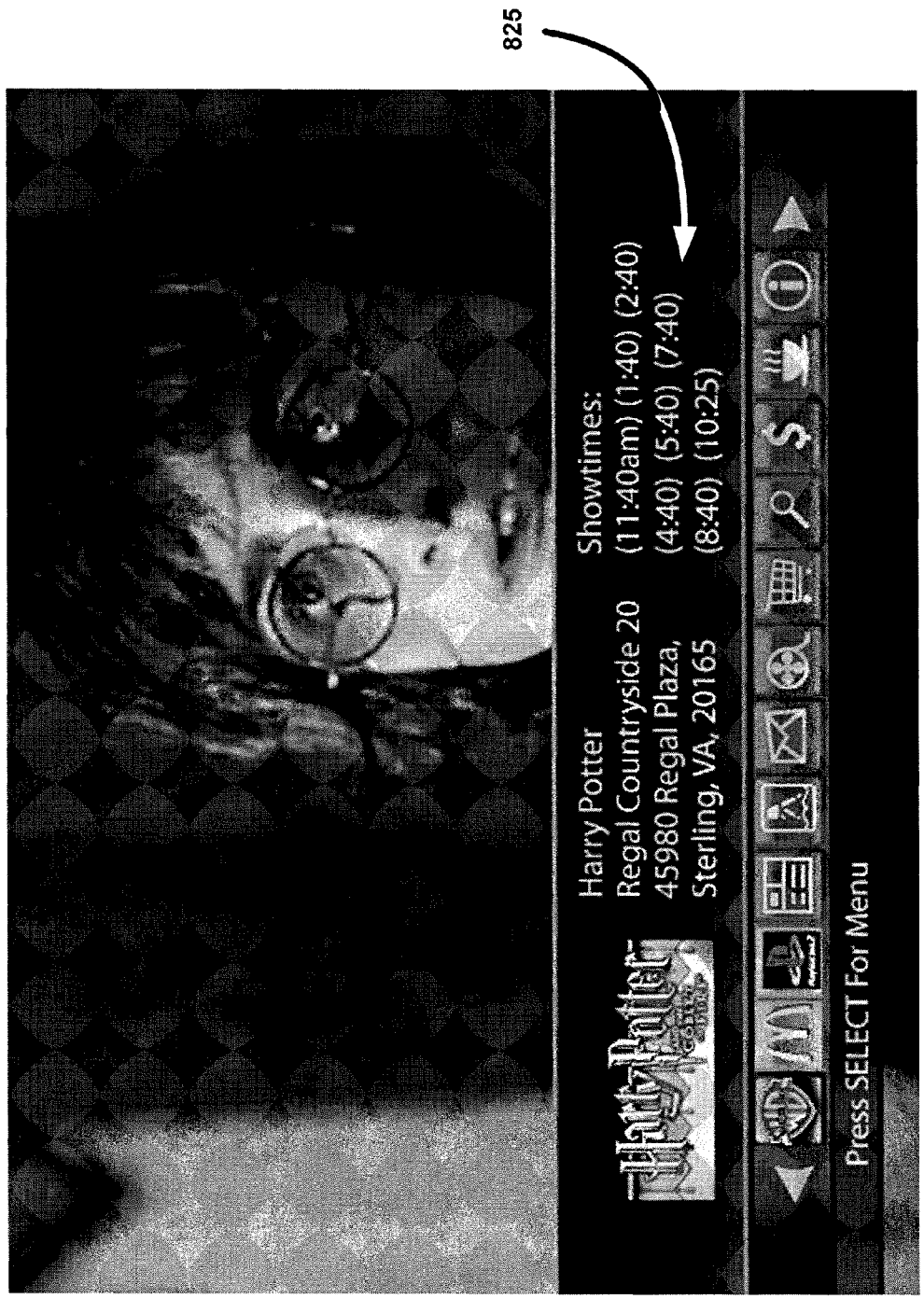
Figure 8:
Figure 8:
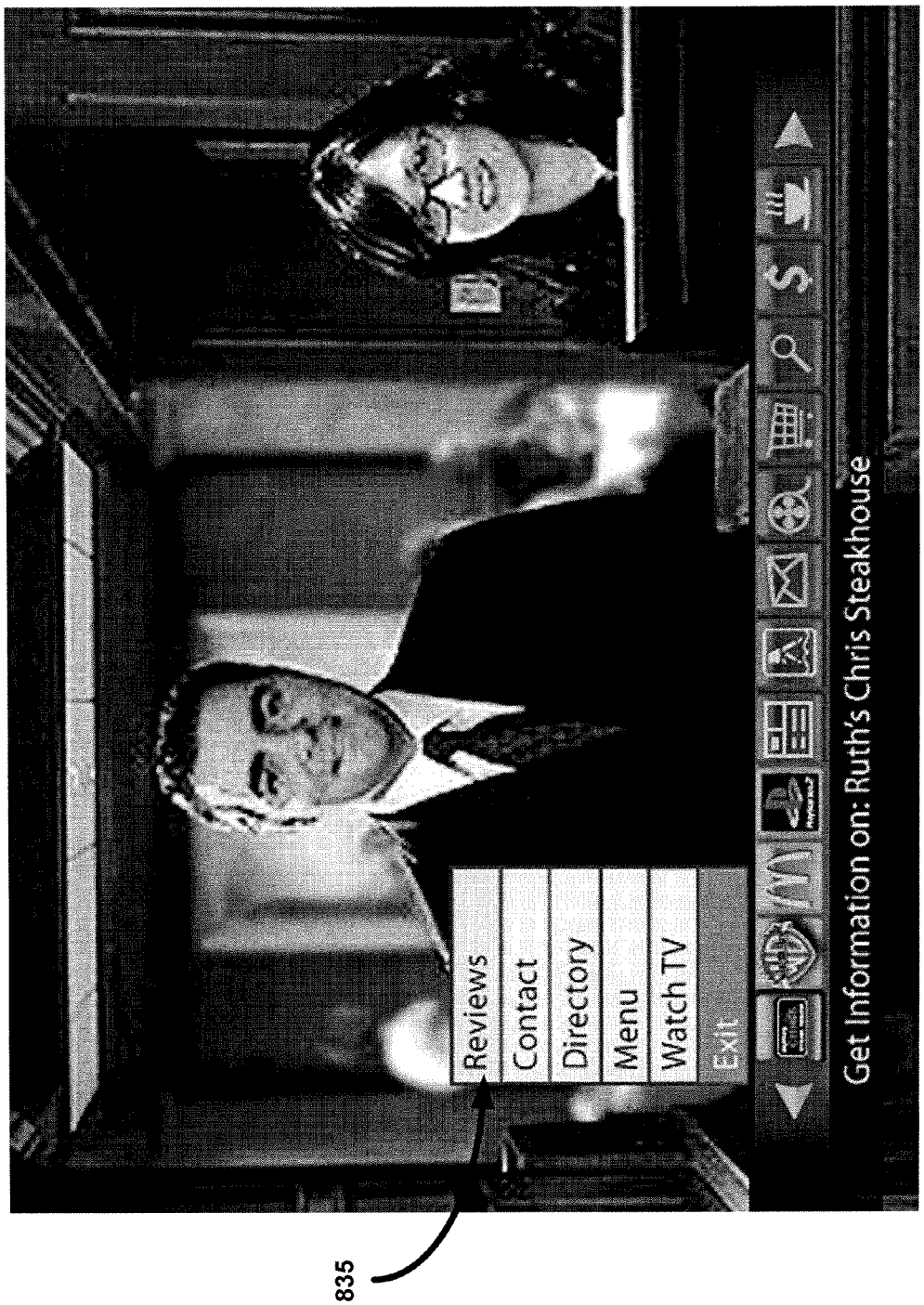
Figure 8:
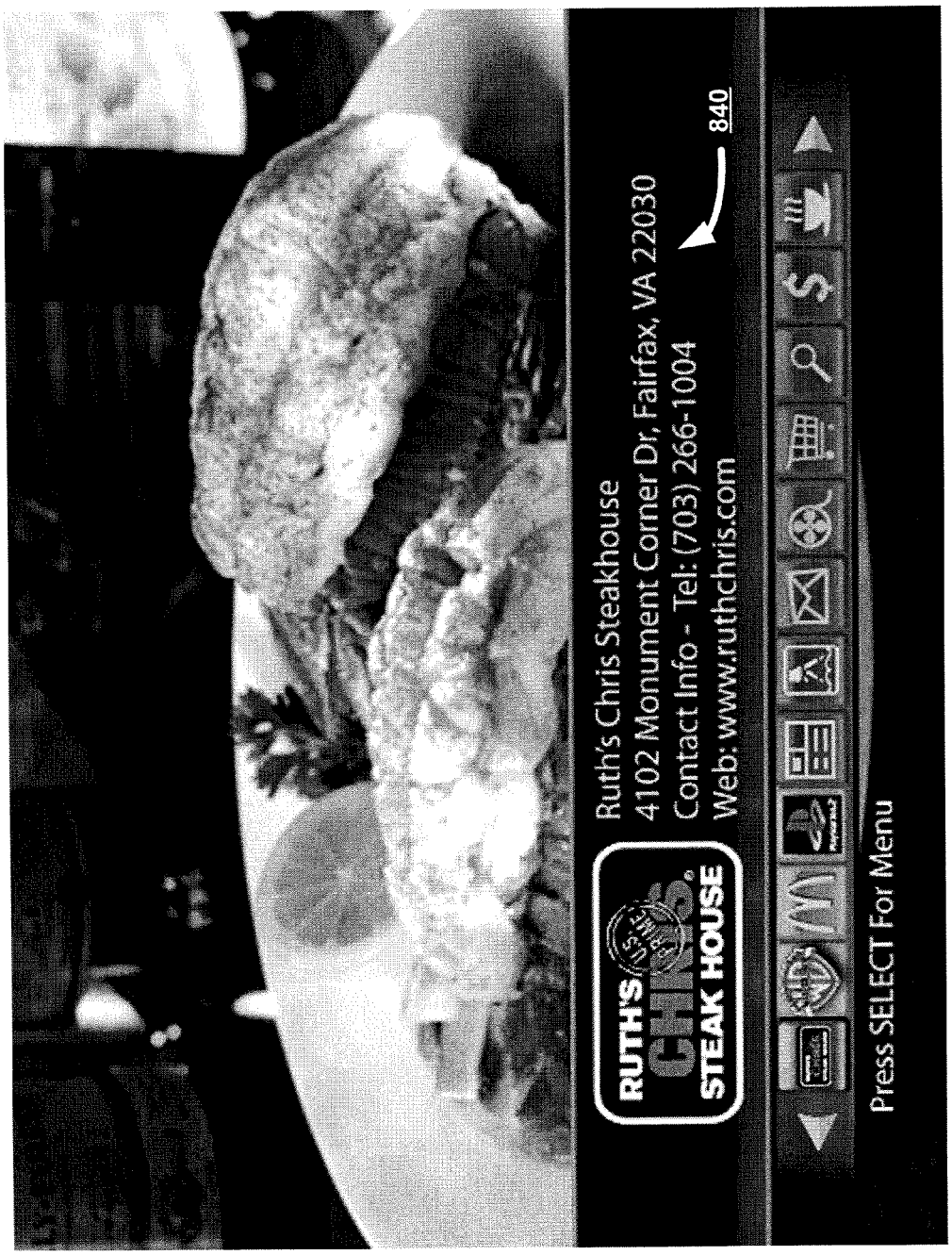

In an alternative embodiment of the present invention, and in reference to FIG. 4, the system and method for creating and displaying television widgets includes downloading Television widgets 415 onto the random access memory (RAM) 425 of a set-top box 460 (with its operating system 455), or any other consumer electronics device capable of displaying the TV widgets either via a high-speed in-band data carousel 410 (e.g. the Biap RIBS datacaster) or by embedding the widgets within the broadcast video stream (MPEG). The advantage of downloading the TV widgets over the prior art applications such as the EBIF (Enhanced TV Binary Interchange Format), lies in the power of the TV widgets 415 that can perform high-level computation and leverage the facilities in the TV Widget Framework 445 (e.g., recommendation engine, smart interface components, etc.). In addition, the TV widgets 415 consist of bytecode, are much more compact than the corresponding XML content in the EBIF applications, and are invoked via the selection of a corresponding icon from a "task bar" 815, as shown in FIG. 8 (b), where a single key of the remote control device is used to control to toggle the visibility of the "task bar" onto the bottom part of the television screen for ease of use; the arrow keys of the remote control device is used for selecting of any one of the TV widgets that are on the task bar. The television widgets of the present invention are executed on a TV widget virtual machine 450 which is contained within the TV widget framework 445 as shown in FIG. 4. In addition, the TV widget framework 445 provides a number of built-in components such as dynamic libraries 420, and data modules 440 shown contained in the random access memory 425 of set-top box 460 that may also contain other applications 430, for all widgets to use, in order for the TV widgets to be executed without the need to include code to implement those components, such as, buttons, list boxes, Smart Entry Fields, Virtual Keyboards, Menus, Images, Static Text, Tickers, Etc. The TV widgets and the TV Widget framework of the present invention may be integrated into a specific architecture of an MSO (multiple services operator, which is a generic term for the provider of video programs and related services like Video on Demand, Electronic Program Guides, and Internet/Data Services), or may be implemented as a stand-alone framework.

Figure 5:
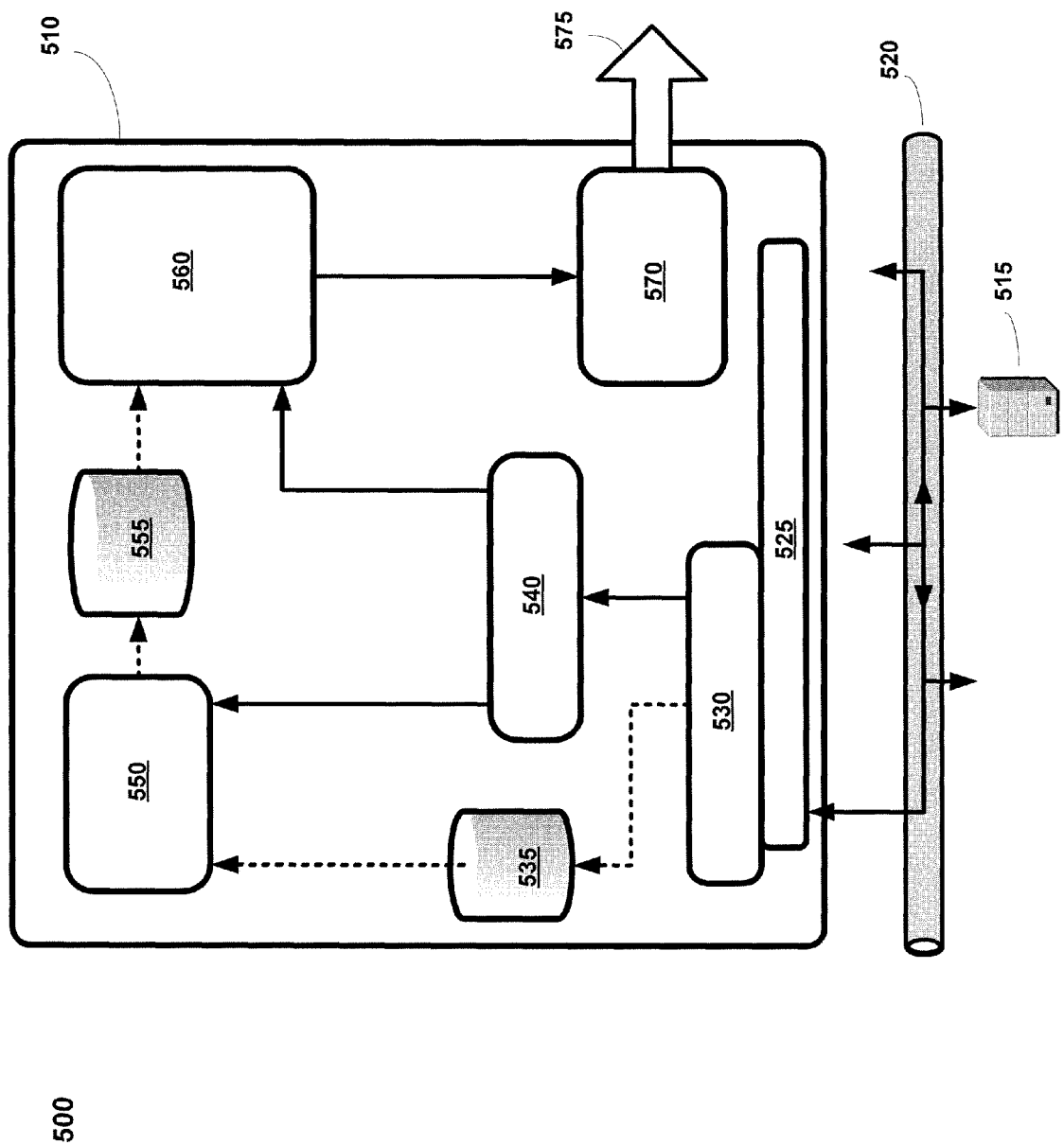
FIG. 5 is a block diagram including an application server and an in-band data-caster according to an embodiment of the present invention.

In yet another embodiment of the present invention, and in reference to FIG. 5, there is shown an arrangement for creating and delivering television widgets, where application server 515 and in-band datacaster 510 are utilized to create and deliver the television widgets of the present invention either statically or dynamically via an IP gateway such as Ethernet 520. Since the set-top boxes that facilitate the video, audio and data to televisions are limited in terms of memory storage, the television widget modules after being created, reside on application server 515, and are retrieved on demand and delivered from in-band datacaster 510 via Apache/HTTP server 525 that utilizes a datacaster administrative interface module 530. In the static version, TV widget data is stored in storage 535, transmitted to encoder 550 for transforming the data to an MPEG-2 stream as needed where player 560 may repeatedly stream it to video pump 570 that streams MPEG-2 transport stream and deliver it over a Gigabit Ethernet (GigE) or an Asynchronous serial interface (ASI) via 575 to MSO headend facility. Optionally, in the dynamic version, the television widget modules may be directly transmitted to raw data storage 535 for temporary storage, immediately converted to an MPEG-2 stream by encoder 550, streamed to video pump 570 via player 560, and pumped out only once over a GigE or an ASI via 575 to the MSO headend facility. Additionally, datacaster administrative interface module 530 transmits control information to controller 540 to convey control instructions to encoder 550 to convert the TV widget data to an MPEG-2 stream statically or dynamically. Controller 540 also passes control instructions to player 560 to stream the MPEG-2 data repeatedly in the static version, or only once in the dynamic version.

Figure 6:
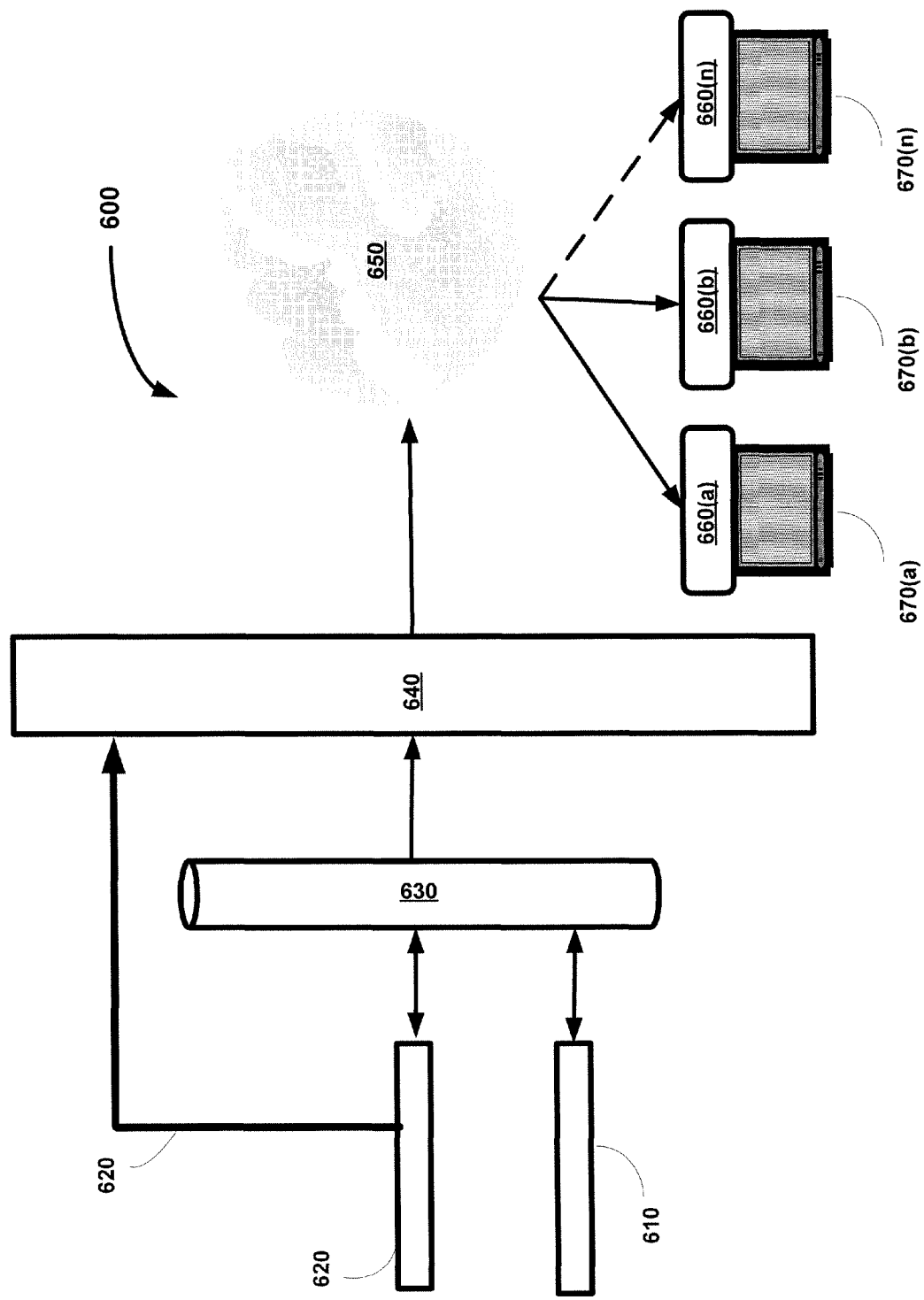
FIG. 6 is a diagram illustrating network architecture with an in-band data-caster and an application server integrated therein according to an embodiment of the present invention.

Referring to the FIG. 6, there is shown a broadband network structure in accordance with a preferred embodiment of the present invention. Broadband network 600 broadly includes Application Server 610 for storing and delivering TV widgets via Ethernet 630 and in-band datacaster 645 where the TV widgets are transformed into an MPEG-2 transport stream and delivered over a Gigabit Ethernet or an Asynchronous serial interface (ASI) via 620 to MSO headend facility 640 to be delivered to set-top boxes 660(a)-660(n) and displayed on user's televisions 670(a)-670(n). Application Server 610 and in-band datacaster 645 are integrated into sample broadband network architecture 600.

Figure 7:
FIG. 7(a) is a source code for creating a widget according to an embodiment of the present invention.
FIG. 7(b) is a widget resulting from the source code of FIG. 8(a) according to an embodiment of the present invention.

The computer code shown in FIG. 7(a) is a short source code for creating the simple widget shown in FIG. 7(b) according to an embodiment of the present invention.

FIGS. 8 (a) through 8 (h) are examples of the television widgets that may be created by the computer software method and system of the present invention. These television widgets include a number of widget buttons, such as for example, a widget invoked with a press of a single remote control key, as shown in FIG. 8(a) that brings up ad widget 815 allowing, for example, the viewer to get detailed information, such as show times 820 of a new "Harry Potter Movie" as shown in FIG. 8 (b). By selecting show times, the viewer is presented with all the relevant information (such as show times, theater and address) 825 of FIG. 8(c). Other widgets include reviews of places of business as shown in FIGS. 8 (d), (e) and (f).

Figure 8H:
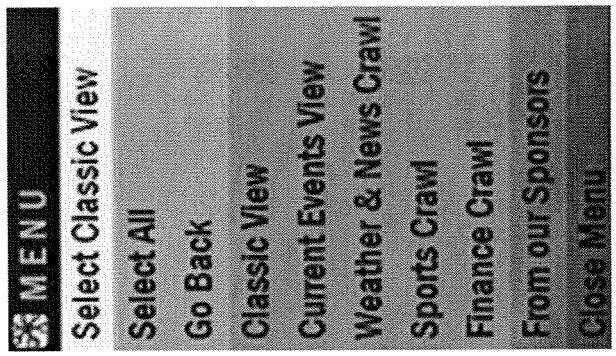
Figure 8G:
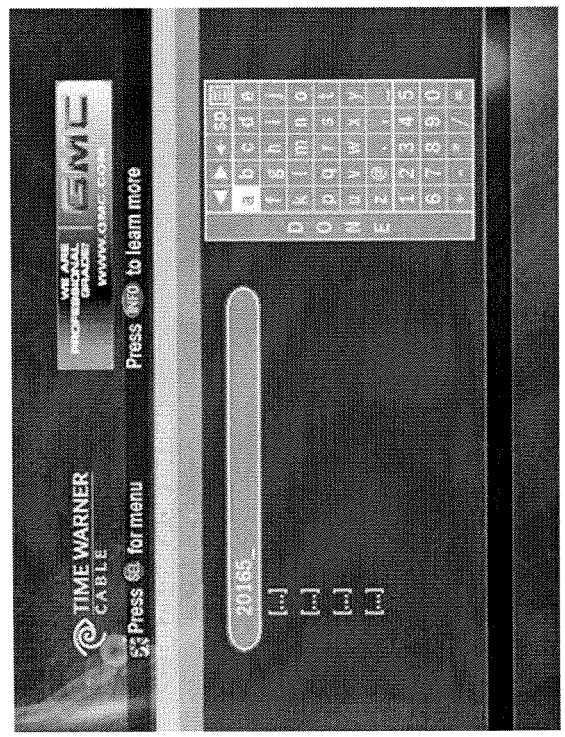

Interactive application user interfaces are severely limited by today's digital cable TV infrastructure. Primarily, this is a result of using a remote-control as an input device. For example, entering text in an instant messaging or chat application is tedious with conventional soft keypads or numeric keypad mappings. But with the enhanced computing resources available, sufficient intelligence can be embedded in user-interface widgets to greatly enhance their usefulness and efficiency. As such, the method and software program of the present invention may be implemented to configure two smart widgets, the smart keypad, and the contextual relevance menu bar as shown in FIGS. 8(g) and 8(h) respectively.

The smart keypad of FIG. 8 (g) aggregates statistical letter frequency information gathered from all applications via the blackboard to build a letter frequency model. With this information the keypad can often guess the next letter or word the user wishes to type, and provide easily accessible shortcuts to the user, significantly speeding up text entry.

The contextual relevance menu bar of FIG. 8 (h) allows applications to leverage information gathered from user and application models to present options to the user that may be invoked with a minimum number of keystrokes, often bypassing many levels in conventional menu hierarchies.

The television widgets of the present invention may include a method for redefining the conventional television program guide, that is delivered to television viewers in the form of a grid structure, as well as other functions of a conventional television navigator (e.g., SARA, TV Guide, or Atlas) as a collection of independent widgets that are separately constructed and delivered to TV viewers. These TV widgets are delivered as a grid guide widget, a "what's on now" widget (sorted by channel), a program search widget, "My 8 ball" a movie and television programming recommendation widget, "My TV search" for searching specific television programs, a sports recommendation widget, a kids recommendation widget, a general program recommendation widget, a DVR control widget, a VOD ordering widget, a View my Bill widget, an Order Pay-Per-View widget, a set preferences widget, a set PIN widget, a customer service widget. Other possible implementations include "My Weather", "My Yellow Pages", "Smart Navigation", and "Instant Messaging with Smart User Interface".

It will be apparent to those skilled in the art that there are many variations that may be made in the embodiments of the invention as described above without departing from the spirit and scope of the invention. There are, for example, different computer languages that one might employ for writing the code that may create the TV widget described in the invention. There are similarly many other variations that will be apparent to those with skill in the art, all within the spirit and scope of the invention.

The invention claimed is:

1. A computerized method for creating and implementing television widgets in a television widgets framework, the method comprising:
   defining television widgets as source code, the television widgets comprising independent self-contained mini-applications including a graphical user interface, wherein the self-contained mini-applications each perform a single well defined task;
   storing the television widgets in a source code library;
   translating the source code into a byte code format suitable for execution on a target virtual machine;
   mapping a set of internal application programming interfaces used by applications into the application programming interfaces of an operating system, resident application, or a middleware; and
   providing the television widgets to a remote customer premise equipment, wherein:
      the television widgets are capable of being executed for display on a digital television associated with the remote customer premises equipment, and
      each television widget can be used independently by a viewer without switching the viewer's context from a current television program display on the digital television.

2. The method of claim 1, wherein the defined television widgets import graphics and other data files.

3. The method of claim 1, wherein the translated byte code is further transformed into a JAVA byte code suitable for a JAVA virtual machine.

4. The method of claim 1, wherein the operating system that internal APIs mapped into is one of PowerTV, GIOS, and Windows.

5. The method of claim 1, wherein the resident applications that internal APIs are mapped into is one of SARA, Atlas, TWC MDN, TV-Guide, and Passport.

6. The method of claim 1, wherein the created television widgets are further converted and downloaded onto a digital set-top box, and displayed on a digital television.

7. The method of claim 6, wherein the created television widgets are converted into an MPEG-2 data stream and delivered over Gigabit Ethernet or an Asynchronous serial interface in a static or a dynamic fashion.

8. The method of claim 6, wherein the created television widgets are downloaded into the digital set-top box via a high-speed in-band data carousel.

9. The method of claim 6, wherein the created television widgets are downloaded into the digital set-top box by embedding it within a broadcast video stream.

10. The method of claim 1, wherein middleware includes graphics, video, sound and other display services.

11. The method of claim 1, wherein the television widgets framework is integrated into a specific architecture of a multiple services operator facility.

12. The method of claim 1, wherein the television widgets framework is in a stand-alone configuration, without a middleware or application infrastructure provided by a multiple services operator.

13. A computerized system for creating and implementing television widgets in a television widgets framework, the system comprising:
   a source code library; and
   one or more computer processors collectively programmed to:
      define television widgets as source code, television widgets comprising independent self-contained mini-applications including a graphical user interface, wherein the self-contained mini-applications each perform a single well defined task;
      store the television widgets in the source code library;
      translate the source code into a byte code format suitable for execution on a target virtual machine;
      map a set of internal application programming interfaces used by applications into the application programming interfaces an operating system, resident application, or a middleware; and
      provide the television widgets to a remote customer premise equipment, wherein:
         the television widgets are capable of being executed for display on a digital television associated with the remote customer premises equipment, and
         each television widget can be used independently by a viewer without switching the viewer's context from a current television program display on the digital television.

14. The system of claim 13, wherein the defined television widgets import graphics and other data files.

15. The system of claim 13, wherein the translated byte code is further transformed into a JAVA byte code suitable for a JAVA virtual machine.

16. The system of claim 13, wherein the operating system that internal APIs are mapped into is one of PowerTV, GIOS, and Windows.

17. The system of claim 13, wherein the mapped resident applications that internal APIs are mapped into is one of SARA, TWC MDN, Atlas, TV-Guide, and Passport.

18. The system of claim 13, wherein the created television widgets are further converted and downloaded onto a digital set-top box, and displayed on a digital television.

19. The system of claim 18, wherein the created television widgets are converted into an MPEG-2 data stream and delivered over Gigabit Ethernet or an Asynchronous serial interface in a static or a dynamic fashion.

20. The system of claim 18, wherein the created television widgets are downloaded into the digital set-top box via a high-speed in-band data carousel.

21. The system of claim 18, wherein the created television widgets are downloaded into the digital set-top box by embedding it within a broadcast video stream.

22. The system of claim 13, wherein the middleware includes graphics, video, sound and other display services.

23. The system of claim 13, wherein the television widgets framework is integrated into a specific architecture of a multiple services operator facility.

24. The system of claim 13, wherein the television widgets framework is in a stand-alone configuration, without a middleware or application infrastructure provided by a multiple services operator.

25. A non-transitory computer-readable storage medium having computer-executable instructions for creating and implementing television widgets in a television widgets framework, the computer-readable medium having computer-executable instructions configured to cause logic to:
   define television widgets as source code, the television widgets comprising independent self-contained mini-applications including a graphical user interface, wherein the self-contained mini-applications each perform a single well defined task;
   store the television widgets in a source code library;
   translate the source code into a byte code format suitable for execution on a target virtual machine;

map a set of internal application programming interfaces used by applications into the application programming interfaces an operating system, resident application, or a middleware; and provide the television widgets to a remote customer premise equipment, wherein:
- the television widgets are capable of being executed for display on a digital television associated with the remote customer premises equipment, and
- each television widget can be used independently by a viewer without switching the viewer's context from a current television program display on the digital television.

26. The computer-readable medium having computer-executable instructions of claim 25, wherein the defined television widgets import graphics and other data files.

27. The computer-readable medium having computer-executable instructions of claim 25, wherein the translated byte code is further transformed into a JAVA byte code suitable for a JAVA virtual machine.

28. The computer-readable medium having computer-executable instructions of claim 25, wherein the operating system that internal APIs are mapped into is one of PowerTV, GIOS, and Windows.

29. The computer-readable medium having computer-executable instructions of claim 25, wherein the resident applications that internal APIs are mapped into is one of SARA, Atlas, TWC MDN, TV-Guide, and Passport.

30. The computer-readable medium having computer-executable instructions of claim 25, wherein the created television widgets are further converted and downloaded onto a digital set-top box, and displayed on a digital television.

31. The computer-readable medium having computer-executable instructions of claim 30, wherein the created television widgets are converted into an MPEG-2 data stream and delivered over Gigabit Ethernet or an Asynchronous serial interface in a static or a dynamic fashion.

32. The computer-readable medium having computer-executable instructions of claim 30, wherein the created television widgets are downloaded into the digital set-top box via a high-speed in-band data carousel.

33. The computer-readable medium having computer-executable instructions of claim 30, wherein the created television widgets are downloaded into the digital set-top box by embedding it within a broadcast video stream.

34. The computer-readable medium having computer-executable instructions of claim 25, wherein the middleware includes graphics, video, sound and other display services.

35. The computer-readable medium having computer-executable instructions of claim 25, wherein the television widgets framework are integrated into a specific architecture of a multiple services operator facility.

36. The computer-readable medium having computer-executable instructions of claim 25, wherein the television widgets framework is in a stand-alone configuration, without a middleware or application infrastructure provided by a multiple services operator.

* * * * *

UNITED STATES PATENT AND TRADEMARK OFFICE
CERTIFICATE OF CORRECTION

Page 1 of 1

PATENT NO. : 8,510,779 B2
APPLICATION NO. : 11/532286
DATED : August 13, 2013
INVENTOR(S) : Slothouber et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1412 days.

Signed and Sealed this
Twenty-fourth Day of February, 2015

Michelle K. Lee
*Deputy Director of the United States Patent and Trademark Office*